US009862231B2

(12) United States Patent
Varela et al.

(10) Patent No.: US 9,862,231 B2
(45) Date of Patent: Jan. 9, 2018

(54) BOGIE AXLE SYSTEM

(71) Applicant: ArvinMeritor Technology, LLC, Troy, MI (US)

(72) Inventors: Tomaz Dopico Varela, Shelby Township, MI (US); I-Chao Chung, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 228 days.

(21) Appl. No.: 14/859,444

(22) Filed: Sep. 21, 2015

(65) Prior Publication Data
US 2017/0080752 A1    Mar. 23, 2017

(51) Int. Cl.
| *B60B 35/12* | (2006.01) |
| *B60K 17/36* | (2006.01) |
| *B60B 35/16* | (2006.01) |
| *B60B 35/18* | (2006.01) |
| *F16H 37/02* | (2006.01) |
| *F16H 48/10* | (2012.01) |
| *B60K 17/16* | (2006.01) |
| *F16C 17/10* | (2006.01) |

(52) U.S. Cl.
CPC .......... *B60B 35/16* (2013.01); *B60B 35/125* (2013.01); *B60B 35/18* (2013.01); *B60K 17/16* (2013.01); *B60K 17/36* (2013.01); *F16H 37/02* (2013.01); *F16H 48/10* (2013.01); *B60Y 2200/14* (2013.01); *B60Y 2200/411* (2013.01); *B60Y 2200/45* (2013.01); *F16C 17/10* (2013.01)

(58) Field of Classification Search
None
See application file for complete search history.

(56) References Cited

U.S. PATENT DOCUMENTS

| 1,921,660 A | * | 8/1933 | Church | ................. | B60K 17/36 |
| | | | | | 180/24.05 |
| 3,315,757 A | | 4/1967 | Schlosser | | |
| 3,504,564 A | | 4/1970 | Kell | | |
| 3,976,154 A | | 8/1976 | Clark et al. | | |
| 4,131,169 A | | 12/1978 | Eickhoff et al. | | |
| 4,359,914 A | | 11/1982 | Meisel, Jr. | | |
| 4,560,018 A | | 12/1985 | Satzler | | |
| 4,964,480 A | * | 10/1990 | Kopczynski | ........... | B60G 21/04 |
| | | | | | 180/22 |
| 5,813,938 A | | 9/1998 | Forster | | |
| 5,820,270 A | | 10/1998 | Richardson | | |

(Continued)

FOREIGN PATENT DOCUMENTS

| EP | 0520389 A2 | 12/1992 |
| EP | 2284395 A1 | 2/2011 |

OTHER PUBLICATIONS

Disclosure Statement for U.S. Appl. No. 14/859,444, filed Sep. 21, 2015.

(Continued)

*Primary Examiner* — Justin Holmes
(74) *Attorney, Agent, or Firm* — Brooks Kushman P.C.

(57) ABSTRACT

A bogie axle system having an axle housing, a planetary gear set, a chain housing, and a slew bearing assembly. The axle housing may at least partially receive planetary gear set. The chain housing may receive a drive sprocket unit. The slew bearing assembly may pivotally couple the chain housing to the axle housing.

19 Claims, 7 Drawing Sheets

(56) References Cited

U.S. PATENT DOCUMENTS

| | | |
|---|---|---|
| 6,299,558 B1 | 10/2001 | Jensen |
| 8,313,410 B2 | 11/2012 | Varela |
| 2005/0279563 A1 | 12/2005 | Peterson |
| 2008/0230284 A1 | 9/2008 | Schoon |
| 2016/0167431 A1 | 6/2016 | Barbir |
| 2017/0082175 A1 | 3/2017 | Chung et al. |

OTHER PUBLICATIONS

European Patent Office, Extended European Search Report for the corresponding European Patent Application No. 16185460.9 dated Feb. 3, 2017.

777 parts.net, On-Line Catalog of Spare Parts for Caterpillar, Komatsu, Hitachi, John Deere, Tadano, JCB, Volvo, Doosan, Hyundai machinery, Rear Axle (Final Drive) (Planetary Gear) (Differential Lock Type)—Motor Grader GD655-3, Copyright 2012.

5T7158 Final Drive Group—Motor Grader Caterpillar 16H—16H Motor Grader ATS00001-UP (Machine) Powered by 3196 Engine Power Train) 777 Parts, 777 parts.net—on line catalog of spare parts for Caterpillar, Komatsu, Hitachi, John Deere, Tadano, JCB, Volvo, Doosan, Hyundai machinery, Copyright 2012.

Australian Government, IP Australia, Examination Report No. 1 for standard patent application No. 2016216685, dated May 12, 2017.

\* cited by examiner

BOGIE AXLE SYSTEM

TECHNICAL FIELD

This disclosure relates to a bogie axle system.

BACKGROUND

A drive mechanism having bogies is disclosed in U.S. Pat. No. 6,299,558.

SUMMARY

In at least one embodiment, a bogie axle system is provided. The bogie axle system may include an axle housing, a planetary gear set, a chain housing, and a slew bearing assembly. The planetary gear set may be at least partially disposed in the axle housing and may provide torque to a drive sprocket unit. The chain housing may receive the drive sprocket unit. The slew bearing assembly may pivotally couple the chain housing to the axle housing. The slew bearing assembly may include a slew bearing housing and the spindle. The slew bearing housing may be fixedly disposed on the chain housing. The spindle may be fixedly disposed on the axle housing. The spindle may have a slew bearing core that may be received between the chain housing and the slew bearing housing.

In at least one embodiment, a bogie axle system is provided. The bogie axle system may include an axle housing, a planetary gear set, a chain housing, and a slew bearing assembly. The planetary gear set may be disposed in the axle housing and may provide torque to a drive sprocket unit. The chain housing may receive the drive sprocket unit. The slew bearing assembly may pivotally couple the chain housing to the axle housing. The slew bearing assembly may include a slew bearing housing and a slew bearing core. The slew bearing housing may be fixedly disposed on the chain housing. The slew bearing core may be fixedly disposed on the axle housing and may be received between the chain housing and the slew bearing housing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
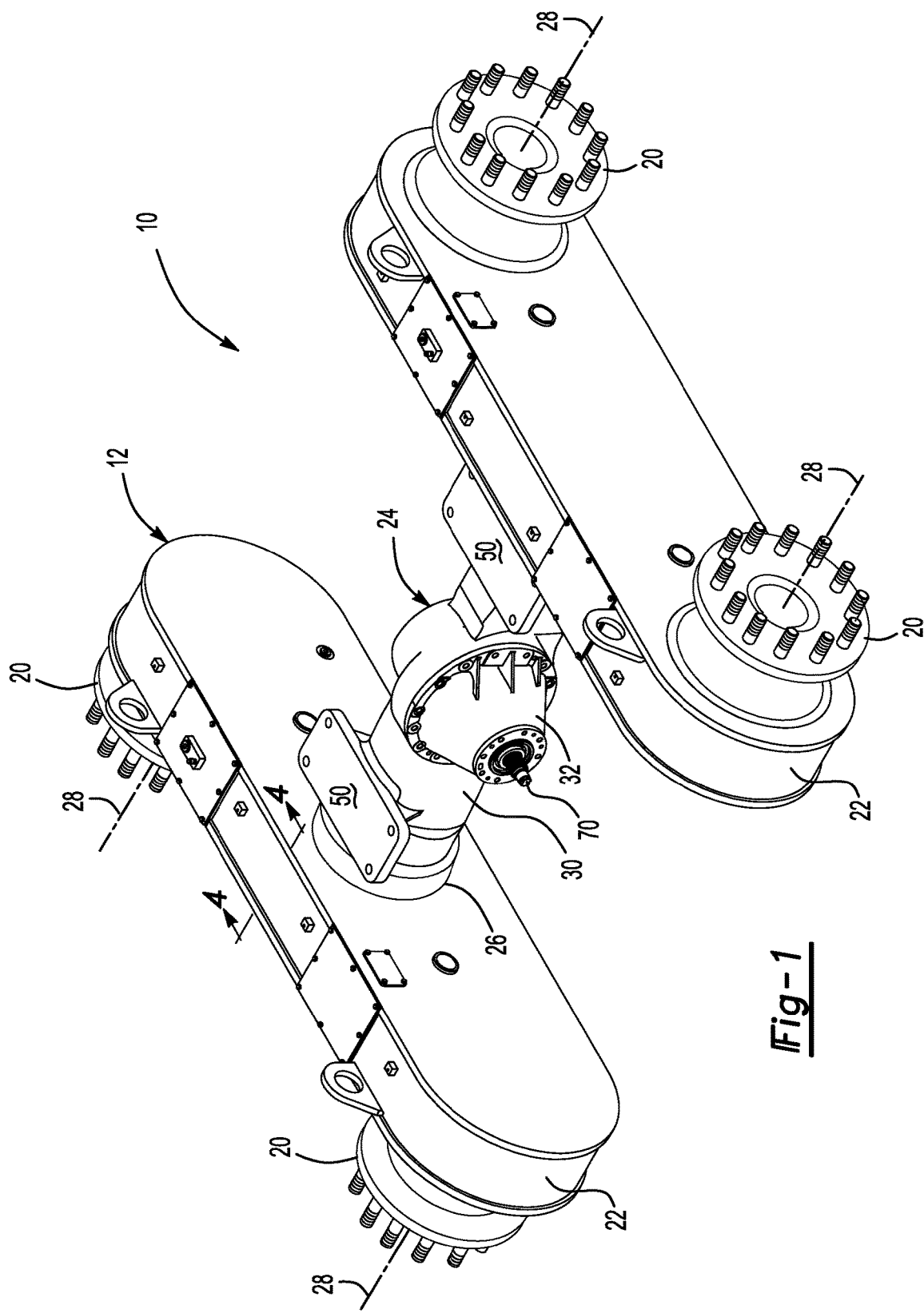
FIG. 1 is a perspective view of a bogie axle system.

Referring to FIG. 1, a bogie axle system 10 is shown. The bogie axle system 10 may be provided with a motor vehicle such as a truck, military transport or weaponry vehicle, or construction equipment like a grader. In at least one embodiment, the bogie axle system 10 may include a plurality of wheel mounts 20, at least one chain housing 22, a bogie axle assembly 24 and a slew bearing assembly 26.

The wheel mount 20 may facilitate mounting of a wheel assembly to the bogie axle system 10. In at least one embodiment, a wheel assembly may include a tire that may be mounted on a wheel. Each wheel mount 20 may rotate about a wheel axis 28 and may be operatively connected to the bogie axle assembly 24. In the embodiment shown, two wheel mounts 20 are provided with each chain housing 22 such that the wheel mounts 20 may be disposed proximate opposite ends of the chain housing 22 and may extend away from the bogie axle assembly 24.

The chain housing 22, which may also be referred to as a chain box, may support one or more wheel mounts 20. The chain housing 22 may be configured as a generally hollow box that may receive sprockets of the wheel mounts 20 and sprockets of the bogie axle assembly 24 as well as chains that may operatively connect a sprocket of the bogie axle assembly 24 to a sprocket of a corresponding wheel mount 20. In FIG. 1, two chain housings 22 are shown that are disposed at opposite ends of the bogie axle assembly 24.

Figure 3:
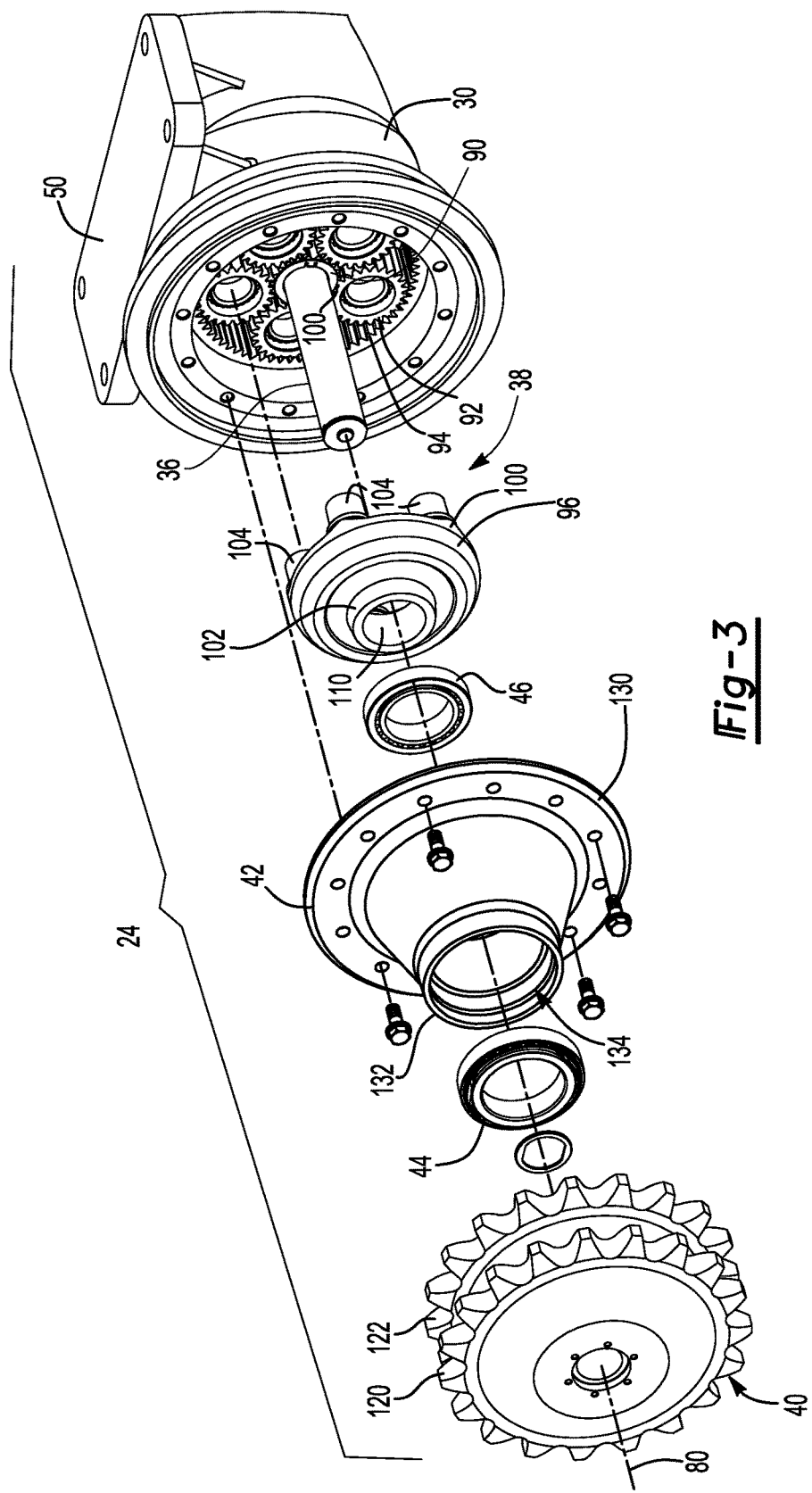
FIG. 3 is an exploded view of a portion of the bogie axle system.
Figure 4:
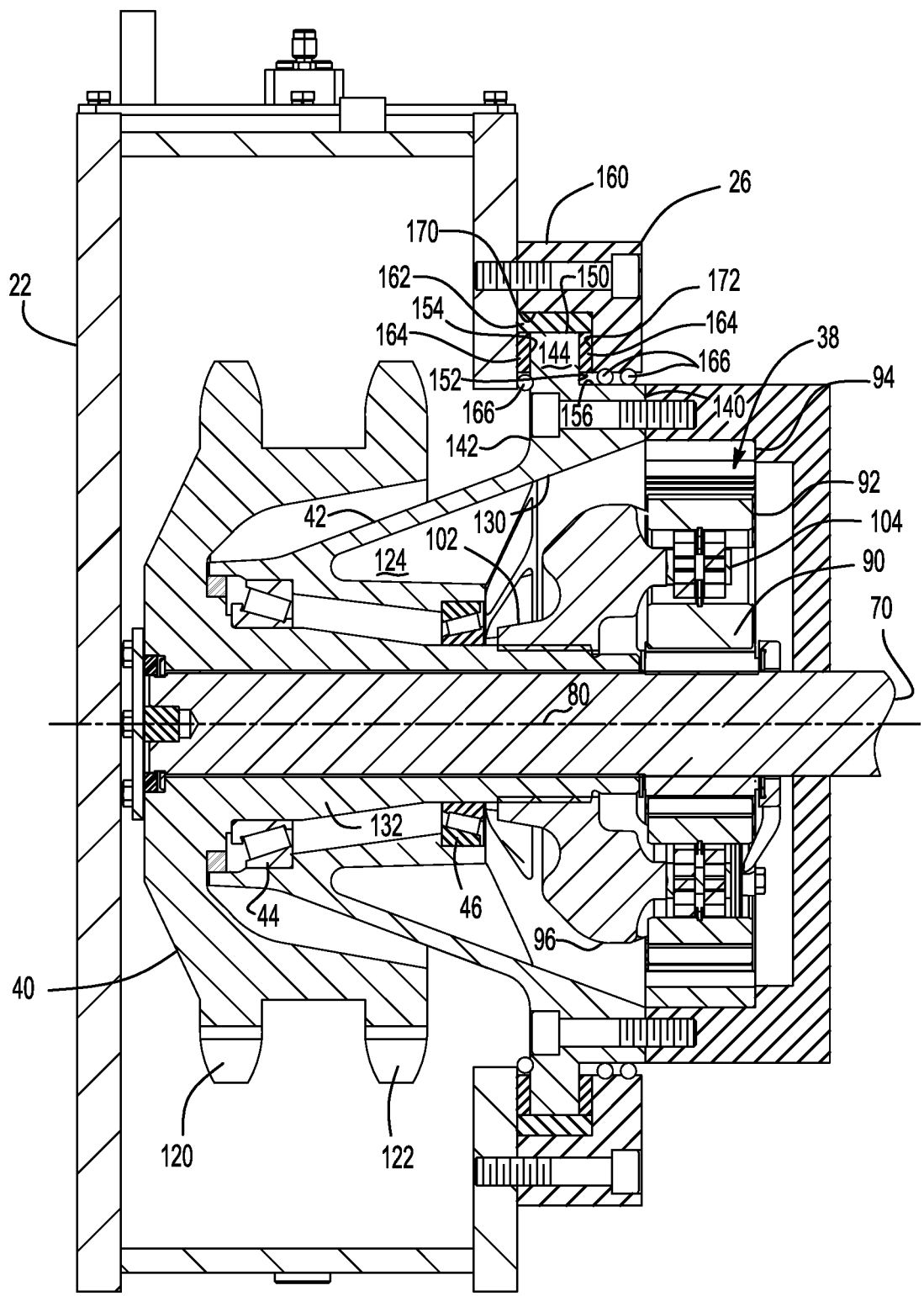
FIG. 4 is a section view of the bogie axle system along section line 4-4.

The bogie axle assembly 24 may extend between the chain housings 22. In addition, bogie axle assembly 24 may provide torque to one or more wheel assemblies via the wheel mounts 20. As is best shown in FIGS. 2-4, the bogie axle assembly 24 may include an axle housing 30, a differential carrier 32, a differential 34, one or more axle shafts 36, one or more planetary gear sets 38, a drive sprocket unit 40, a spindle 42, a first roller bearing assembly 44, and a second roller bearing assembly 46.

Figure 2:
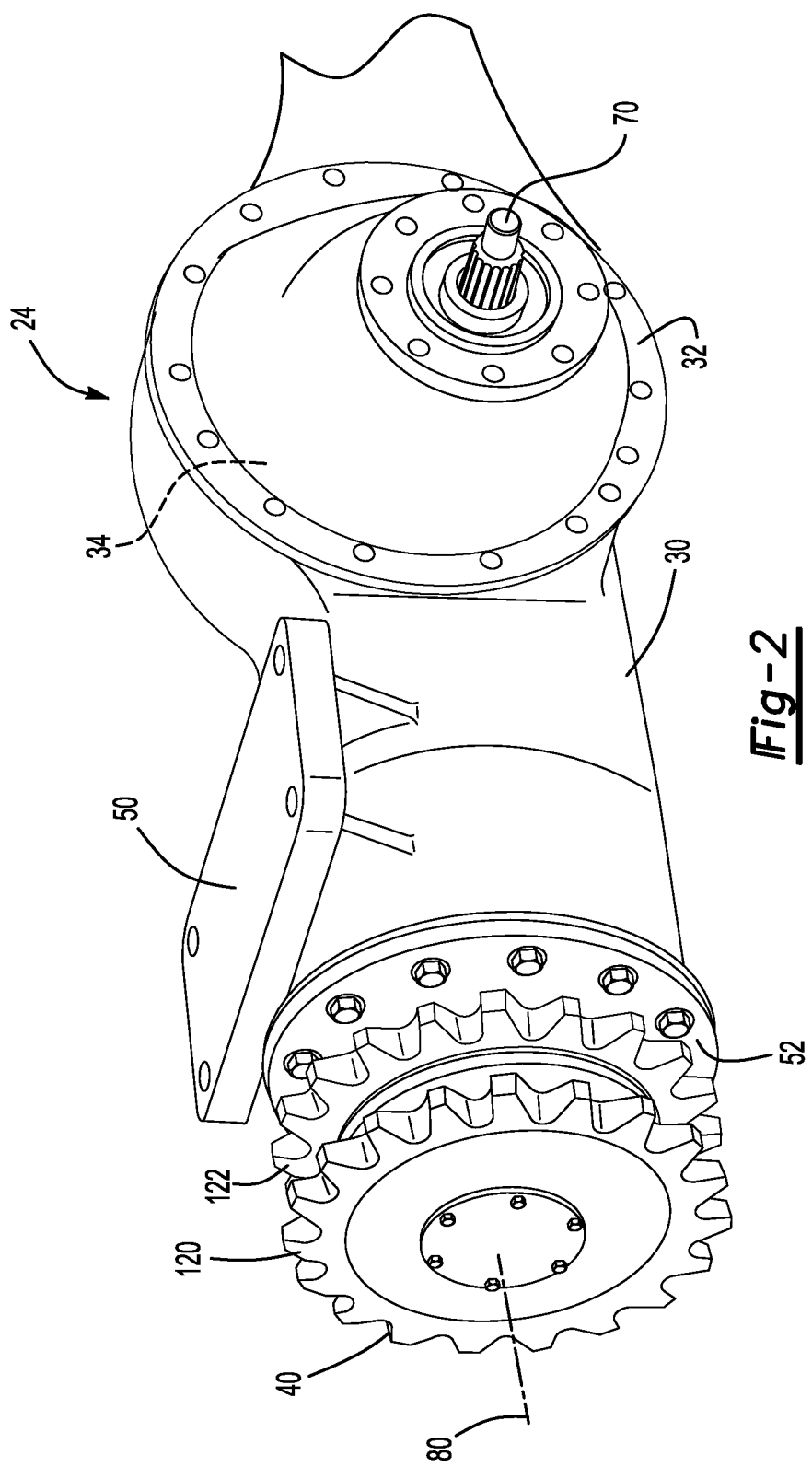
FIG. 2 is a perspective view of a portion of the bogie axle system.

Referring to FIGS. 1 and 2, the axle housing 30 may support components of the bogie axle assembly 24. In addition, the axle housing 30 may facilitate mounting of the bogie axle assembly 24 to the vehicle, such as via one or more mounting plates 50. The axle housing 30 may also include a center portion that may define an opening that may face toward the differential carrier 32 and a cavity that may receive at least a portion of the differential 34. The center portion may be disposed between the chain housings 22 and may be located proximate the center of the axle housing 30.

The differential carrier 32 may be mounted on the axle housing 30. For example, the differential carrier 32 may be mounted on the center portion with a plurality of fasteners, such as bolts. In addition, the differential carrier 32 may support the differential 34. For instance, the differential 34 may be mounted on the differential carrier 32 such that the differential carrier 32 and differential 34 may be installed or removed as a unit, or installed together onto the axle housing 30 or removed together from the axle housing 30.

The differential 34 may be disposed in the axle housing 30. The differential 34 may be configured to transmit torque to the wheel mounts 20 and permit the wheel mounts 20 associated with each chain housing 22 to rotate at different velocities. An input shaft 70 is shown in FIG. 2 to facilitate an abbreviated discussion of the operation of the differential 34.

The input shaft 70 may facilitate coupling of the bogie axle assembly 24 to a torque source. For example, the input shaft 70 may be coupled to a vehicle drivetrain component, such as a drive shaft, that may be coupled to an output of a vehicle transmission or transfer case, which in turn may receive torque from a vehicle power source, such as an engine or motor. The input shaft 70 may be rotatably supported by one or more bearings that may be disposed in the differential carrier 32 and may be operatively connected to a drive pinion. The drive pinion may provide torque to a ring gear. The ring gear may transmit torque to a plurality of differential gears, which in turn may transmit torque to and may be operatively connected to a corresponding axle shaft 36, which is best shown in FIG. 3.

Referring to FIGS. 3 and 4, the axle shaft 36 may transmit torque from the differential 34 to a planetary gear set 38. The axle shaft 36 may be at least partially disposed in the axle housing 30 and may extend along and may be rotated about an axis 80 by the differential 34. The axle shaft 36 may extend through the planetary gear set 38. The axle shaft 36 may have a first end and a second end. The first end may be operatively connected to the differential 34. The second end may be disposed opposite the first end and may be disposed in the chain housing 22.

The planetary gear set 38 may be disposed in the axle housing 30 and may be configured to provide torque to the drive sprocket unit 40 and provide a desired gear reduction ratio. The planetary gear set 38 may include a sun gear 90, a plurality of planet pinions 92, a ring gear 94, and a planet carrier 96.

The sun gear 90 may be disposed proximate the center of the planetary gear set 38. The sun gear 90 may be disposed on the axle shaft 36 such that the sun gear 90 may rotate about the axis 80 with the axle shaft 36.

The planet pinions 92 may be rotatably disposed on the planet carrier 96 between the sun gear 90 and the ring gear 94. Teeth on each planet pinion 92 may mesh with teeth on the sun gear 90 and the ring gear 94.

The ring gear 94 may be disposed in the axle housing 30. For example, the ring gear 94 may be disposed between the axle housing 30 and the planet pinions 92. An outside circumference of the ring gear 94 may be disposed proximate and may engage the axle housing 30. In addition, the ring gear 94 may be fixedly positioned with respect to the axle housing 30.

The planet carrier 96 may be coupled to the planet pinions 92. The planet carrier 96 may be provided in various configurations. As is best shown in FIG. 3, the planet carrier 96 may have a flange portion 100 and a tube portion 102.

The flange portion 100 may include a plurality of hubs 104 that may be operatively connected to corresponding planet pinions 92. For example, a hub 104 may extend from the flange portion 100 and may be received in a corresponding planet gear to help support and position a corresponding planet pinion 92. A roller bearing may be disposed between a hub 104 and a corresponding planet pinion 92 in one or more embodiments. The flange portion 100 may extend further from the axis 80 than the tube portion 102.

The tube portion 102 may extend from the flange portion 100 and may extend axially away from the planet pinions 92 and the ring gear 94. The tube portion 102 may have an inner surface that may at least partially define a planet carrier hole 110 through which the axle shaft 36 and the drive sprocket unit 40 may extend. The inner surface may be spaced apart from and may not engage the axle shaft 36, but may extend around and receive a portion of the drive sprocket unit 40 as is best shown in FIG. 4. As such, the drive sprocket unit 40 may be received in and may be fixedly coupled to the inner surface, such as with mating splines.

Referring to FIGS. 2-4, the drive sprocket unit 40 may be disposed at an end of the bogie axle assembly 24 and may be received in the chain housing 22. The drive sprocket unit 40 may include one or more sprockets that may support and actuate a chain that may couple the drive sprocket unit 40 a sprocket of a corresponding wheel mount 20. It is also contemplated that the drive sprocket unit 40 may be connected to a wheel mount 20 with one or more gears rather than with a chain, in which case the teeth of the drive sprocket unit 40 may have teeth that may be suitable for meshing with another gear. The drive sprocket unit 40 may be fixedly positioned with respect to the planet carrier 96 or may be fixedly disposed on the planet carrier 96 and may be received in the planet carrier hole 110. For instance, the drive sprocket unit 40 may be fixedly disposed on the planet carrier 96 with mating splines, fasteners such as bolts or bolts and dowel pins, or combinations thereof. The drive sprocket unit 40 may include an outer sprocket 120 and an inner sprocket 122.

The outer sprocket 120 and the inner sprocket 122 may each have a plurality of sprocket teeth that may be arranged around the axis 80. The sprocket teeth may extend away from the axis 80 and be configured to engage a corresponding chain. The sprocket teeth of the outer sprocket 120 may be positioned further from the axle housing 30 than the sprocket teeth of the inner sprocket 122. The outer sprocket 120 may be integrally formed with the inner sprocket 122 or the outer sprocket 120 and the inner sprocket 122 may be provided as separate components that may be fastened together.

The spindle 42 may be fixedly disposed on the axle housing 30 or fixedly positioned with respect to the axle housing 30. In addition, the spindle 42 may be configured to help position and/or support the first roller bearing assembly 44 and/or the second roller bearing assembly 46. The spindle 42 may be mounted to the axle housing 30 in any suitable manner, such as with one or more fasteners like bolts. In at least one embodiment, spindle 42 may extend from the axle housing 30 into a cavity 124 of the drive sprocket unit 40 and into the chain housing 22. In addition the spindle 42 may extend around at least a portion of the drive sprocket unit 40 and the planet carrier 96 and may rotatably support the drive sprocket unit 40. The spindle 42 may include a mounting flange 130, a spindle tube portion 132, and a spindle hole 134.

The mounting flange 130 may facilitate coupling of the spindle 42 to the axle housing 30. The mounting flange 130 may include a plurality of fastener holes that may receive one or more fasteners, such as bolts, that may couple the mounting flange 130 to the axle housing 30. The mounting flange 130 may extend around the axis 80 and may extend further from the axis 80 than the spindle tube portion 132.

The mounting flange 130 may be part of the slew bearing assembly 26. The slew bearing assembly 26 may pivotally couple the chain housing 22 to the axle housing 30. As such, the slew bearing assembly 26 may allow the chain housing 22 to rotate about the axis 80 with respect to the axle housing 30.

Referring to FIG. 4, the mounting flange 130 may have an end surface 140, a face surface 142, and a slew bearing core 144.

The end surface 140 may face toward and may engage the axle housing 30. The end surface 140 may be disposed substantially perpendicular to the axis 80 in one or more embodiments.

The face surface 142 may be disposed opposite the end surface 140. The face surface 142 may also be disposed substantially perpendicular to the axis 80 in one or more embodiments. The face surface 142 may be disposed outside of the chain housing 22.

The slew bearing core 144 may be disposed proximate an end of the mounting flange 130. The slew bearing core 144 may extend continuously around the axis 80 and may extend away from the axis 80. In at least one embodiment, the slew bearing core 144 may include an outer surface 150, an inboard surface 152, and an outboard surface 154.

The outer surface 150 may extend continuously around the axis 80 and may extend from the inboard surface 152 to the outboard surface 154. The outer surface 150 may be radially disposed with respect to the axis 80 and may face away from the axis 80. As such, the outer surface 150 may be an outside circumference of the slew bearing core 144.

Figure 5:
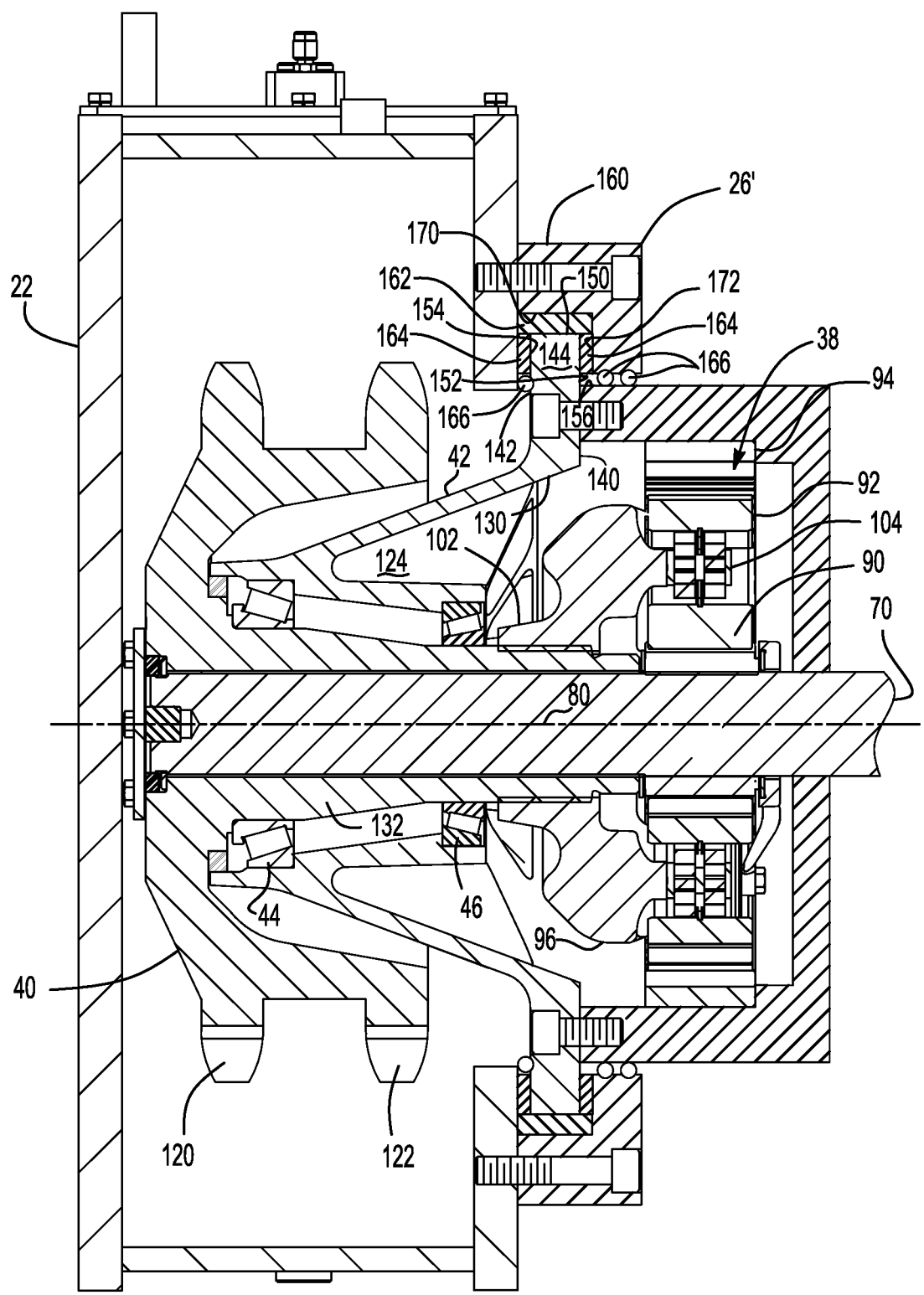
FIG. 5 is a section view of a second embodiment of the bogie axle system.

The inboard surface 152 may face toward the axle housing 30. The inboard surface 152 may extend from the outer surface 150 toward the axis 80 and to a rim surface 156. The inboard surface 152 may be offset from the end surface 140 and may not be aligned with the end surface 140 as shown in FIG. 4. Alternately, the inboard surface 152 may be aligned with and may be substantially coplanar with the end surface 140 as shown in FIG. 5.

The outboard surface 154 may be disposed opposite the inboard surface 152 and may face toward the chain housing 22. The outboard surface 154 may extend from the outer surface 150 toward the axis 80. The outboard surface 154 may be substantially coplanar with the face surface 142 of the spindle 42.

The slew bearing assembly 26 may also include a slew bearing housing 160, a radial sleeve 162, at least one thrust washer 164, and at least one seal 166.

The slew bearing housing 160 may be fixedly disposed on the chain housing 22. For instance, the slew bearing housing 160 may be fixedly attached to the chain housing 22 with a plurality of fasteners, such as bolts, that may be arranged around the axis 80. The slew bearing housing 160 may extend around the axis 80 and the slew bearing core 144 such that the slew bearing core 144 may be received between the chain housing 22 and a portion of the slew bearing housing 160 that is spaced apart from the chain housing 22. The slew bearing housing 160 may extend continuously around the axle housing 30, the spindle 42, or both. The slew bearing housing 160 may have an inner radial surface 170 and an inner face surface 172.

The inner radial surface 170 may extend around the axis 80 and around the slew bearing core 144. The inner radial surface 170 may extend from the chain housing 22.

The inner face surface 172 may extend from the inner radial surface 170 toward the axis 80. The inner face surface 172 may be spaced apart from the chain housing 22 and may be disposed substantially perpendicular to the inner radial surface 170.

The radial sleeve 162 may extend around the axis 80 and may be disposed between the outer surface 150 of the slew bearing core 144 and the inner radial surface 170 of the slew bearing housing 160. As such, the radial sleeve 162 may extend around the slew bearing core 144 and may engage the outer surface 150. The radial sleeve 162 may allow the slew bearing housing 160 and the chain housing 22 to rotate about the axis 80 with respect to the slew bearing core 144 and the axle housing 30.

At least one thrust washer 164 may be provided adjacent to the slew bearing core 144. For example, a first thrust washer 164 may be provided between the chain housing 22 and the outboard surface 154 of the slew bearing core 144. The first thrust washer 164 may engage the chain housing 22 and the outboard surface 154. A second thrust washer 164 may be disposed opposite the first thrust washer 164 and may be provided between the inner face surface 172 of the slew bearing housing 160 and the inboard surface 152 of the slew bearing core 144. The second thrust washer 164 may engage the inboard surface 152 and the inner face surface 172. The first and second thrust washers 164 may also engage the radial sleeve 162 at an end. The first and second thrust washers 164 may cooperate to inhibit axial movement of the chain housing 22 with respect to the slew bearing core 144 while permitting the chain housing 22 to rotate about the axis 80. As such, the slew bearing assembly 26 may be provided without any roller bearing elements, such as those provided with the first and second roller bearing assemblies 44, 46.

At least one seal 166 may be provided to inhibit contaminants from entering the slew bearing assembly 26. In FIG. 4, three seals 166 are shown, although it is contemplated that a greater or lesser number of seals may be provided. A first seal 166 may extend from the chain housing 22 and the slew bearing core 144 and may be disposed proximate an end of the first thrust washer 164. A second seal 166 and a third seal 166 may be provided between the spindle 42 and the end surface of the slew bearing housing 160. In FIG. 4, a second seal 166 and a third seal 166 extend from the slew bearing housing 160 to the rim surface 156 of the spindle 42. In FIG. 5, a second seal 166 and a third seal 166 extend from the slew bearing housing 160 to the axle housing 30.

The spindle tube portion 132 may extend from the mounting flange 130 and may extend axially away from the planet pinions 92 and ring gear 94. The spindle tube portion 132 may have an inner spindle surface that may be disposed proximate and may engage the first roller bearing assembly 44, the second roller bearing assembly 46, and the drive sprocket unit 40.

The first roller bearing assembly 44 may be disposed in the chain housing 22. The first roller bearing assembly 44 may include a plurality of rolling elements, such as balls or rollers, which may be disposed between an inner race and an outer race. The inner race may be disposed on the drive sprocket unit 40. The outer race may be disposed on the spindle 42.

The second roller bearing assembly 46 may be spaced apart from the first roller bearing assembly 44. The second roller bearing assembly 46 may be disposed in the chain housing 22. The second roller bearing assembly 46 may include a plurality of rolling elements, such as balls or rollers, which may be disposed between an inner race and an outer race. The inner race may be disposed on the drive sprocket unit 40. The outer race may be disposed on the spindle 42. The second roller bearing assembly 46 may be axially positioned between the first roller bearing assembly 44 and the end surface of the planet carrier 96 such that the planet carrier 96 may inhibit axial movement of the second roller bearing assembly 46.

Referring to FIG. 5, a portion of a bogie axle system is shown with a second version of a slew bearing assembly 26'. The slew bearing assembly 26' is the similar to that shown in FIG. 4. In FIG. 5, the inboard surface 152 of the slew bearing core 144 is aligned with and may be substantially coplanar with the end surface 140 of the mounting flange 130 of the spindle 42. The axle housing 30 extends to the inboard surface 152, but is longer than the configuration shown n FIG. 4. As such, a portion of the axle housing 30 is disposed between the axis 80 and the mounting flange 130 and the second seal 166 and the third seal 166 extend from the slew bearing housing 160 to the axle housing 30.

Figure 6:
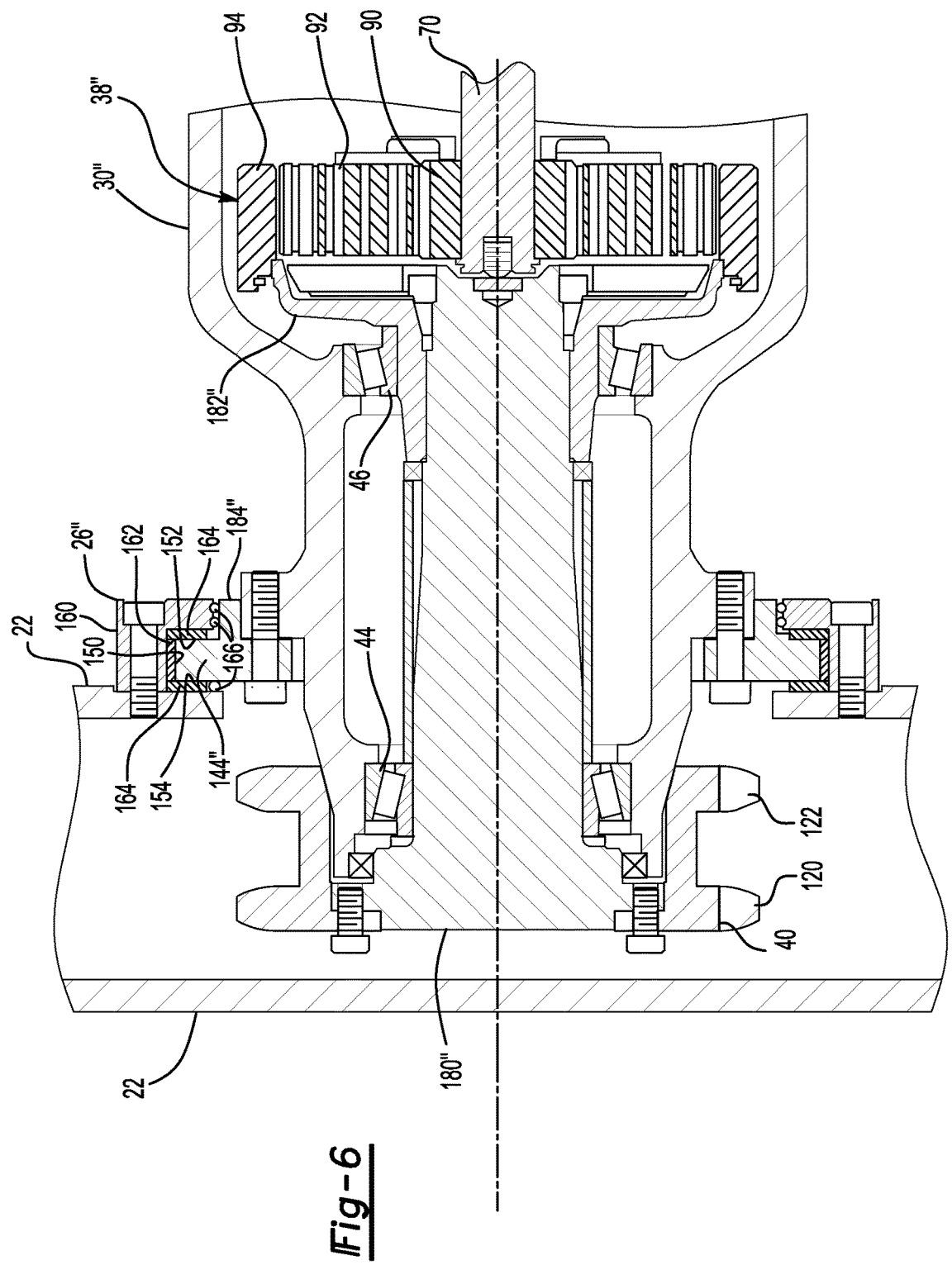
FIG. 6 is a section view of a third embodiment of the bogie axle system.

Referring to FIG. 6, another version of a bogie axle system is shown. In this version, the bogie axle system does not have a spindle. Instead, the axle housing 30" extends into the chain housing 22 and rotatably supports the drive sprocket unit 40. The planetary gear set 38" may be disposed entirely in the axle housing 30" and may be configured to provide torque to the drive sprocket unit 40 and a desired gear reduction ratio. The planetary gear set 38" may be configured such that the ring gear 94 may rotate about the axis 80 and may be coupled to an output shaft 180" via a ring gear hub 182". The output shaft 180" may rotate about the axis 80 and may be coupled to the drive sprocket unit 40. The slew bearing assembly 26" may again pivotally couple the chain housing 22 to the axle housing 30 and may include a slew bearing core 144" that may not be provided with a spindle, but instead may be a separate component disposed between the axle housing 30 and the chain housing 22. The slew bearing core 144" may have an outer surface 150, an inboard surface 152, and an outboard surface 154 as previously described. In addition, the slew bearing core 144" may have a ring portion 184" that may extend continuously around the axle housing 30 and may extend between the axle housing 30 and an end of the slew bearing housing 160 that faces toward the axis 80. As such the ring portion 184" may separate the axle housing 30 from the slew bearing housing 160. The second seal 166 and the third seal 166 may extend from the slew bearing housing 160 to the ring portion 184" of the slew bearing core 144".

Figure 7:
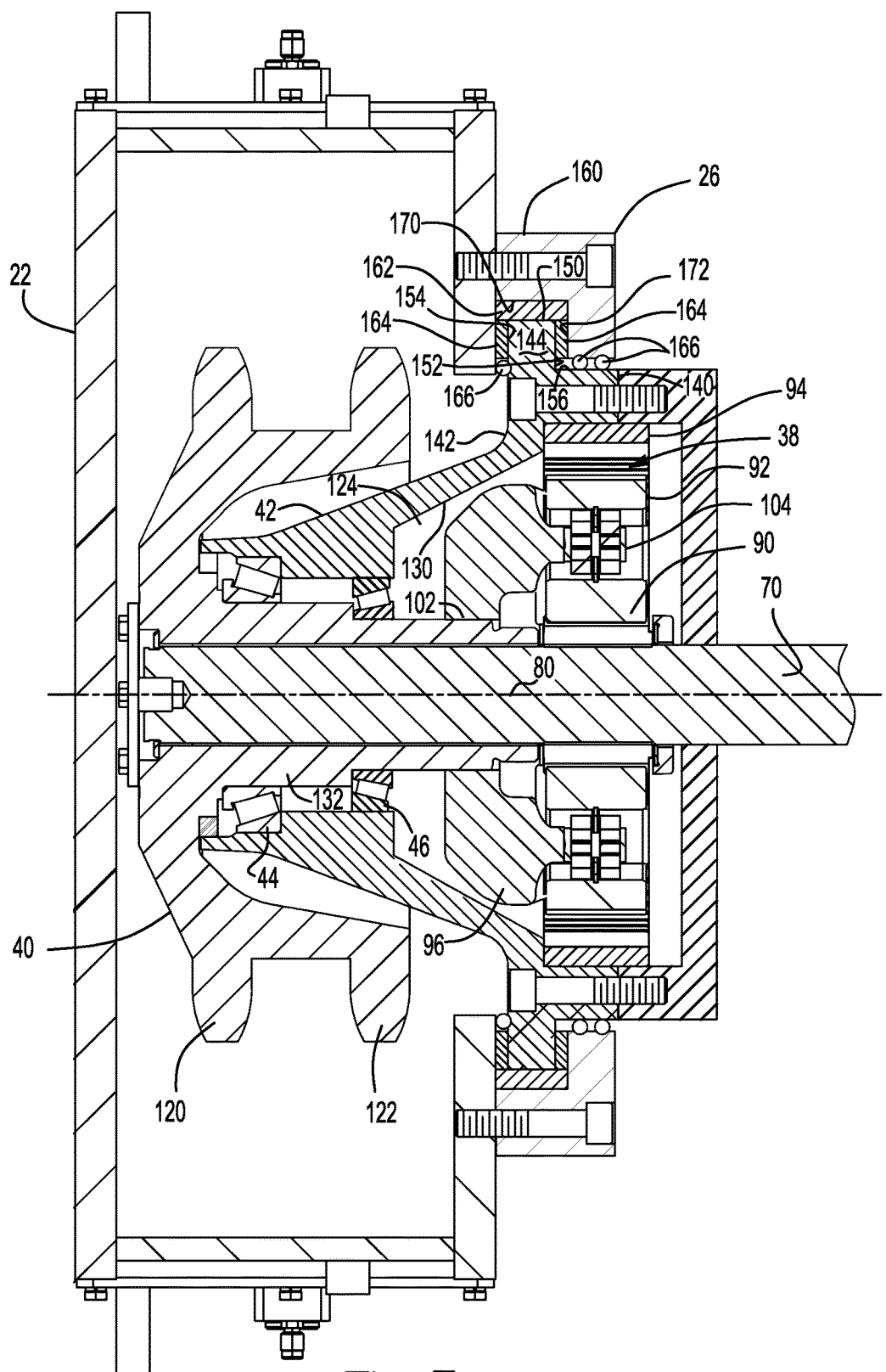
FIG. 7 is a section view of a fourth embodiment of the bogie axle system.

Referring to FIG. 7, another version of a bogie axle system is shown. This version is similar to the version shown in FIG. 4, but the ring gear 94 is at least partially received inside the spindle 42. It is contemplated that the ring gear 94 may be completely received inside the spindle 42 in one or more embodiments. In such configurations, the ring gear 94 may be press fit into the spindle 42, which may help facilitate assembly of the bogie axle system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bogie axle system comprising:
   an axle housing;
   a planetary gear set that is at least partially disposed in the axle housing and that provides torque to a drive sprocket unit, wherein the planetary gear set has a planet carrier and the drive sprocket unit is fixedly positioned with respect to the planet carrier;
   a chain housing that receives the drive sprocket unit; and
   a slew bearing assembly that pivotally couples the chain housing to the axle housing, the slew bearing assembly including:
   a slew bearing housing that is fixedly disposed on the chain housing; and
   a spindle that is fixedly disposed on the axle housing and that has a slew bearing core that is received between the chain housing and the slew bearing housing, wherein the spindle extends around the drive sprocket unit and the planet carrier and rotatably supports the drive sprocket unit.

2. The bogie axle system of claim 1 wherein the slew bearing assembly further comprises a radial sleeve that extends around the slew bearing core and is disposed between the slew bearing core and the slew bearing housing.

3. The bogie axle system of claim 2 wherein the slew bearing assembly further comprises a first thrust washer that is disposed between the chain housing and the slew bearing core.

4. The bogie axle system of claim 3 wherein the slew bearing assembly further comprises a second thrust washer that is disposed opposite the first thrust washer and is disposed between the slew bearing housing and the slew bearing core.

5. The bogie axle system of claim 4 wherein the slew bearing housing extends continuously around the spindle.

6. The bogie axle system of claim 4 wherein the slew bearing housing extends continuously around the spindle and the axle housing.

7. The bogie axle system of claim 4 wherein the slew bearing core has an outboard surface that engages the first thrust washer, an inboard surface disposed opposite the outboard surface that engages the second thrust washer, and an outer surface that engages the radial sleeve.

8. The bogie axle system of claim 7 wherein the spindle has an end surface that engages the axle housing and a face surface disposed opposite the end surface, wherein the outboard surface is substantially coplanar with the face surface and the inboard surface is offset from the end surface.

9. The bogie axle system of claim 7 wherein the spindle has an end surface that engages the axle housing and a face surface disposed opposite the end surface, wherein the outboard surface is substantially coplanar with the face surface and the inboard surface is substantially coplanar with the end surface.

10. The bogie axle system of claim 3 further comprising a first seal that extends from the chain housing to the slew bearing core, wherein the first seal is disposed proximate an end of the first thrust washer.

11. The bogie axle system of claim 3 further comprising a second seal that extends from the slew bearing housing to the spindle.

12. The bogie axle system of claim 3 further comprising a second seal that extends from the slew bearing housing to the axle housing.

13. The bogie axle system of claim 1 wherein the planetary gear set has a ring gear and the ring gear is at least partially received in the spindle.

14. A bogie axle system comprising:
    an axle housing;
    a planetary gear set that is disposed in the axle housing and that provides torque to a drive sprocket unit;
    a chain housing that receives the drive sprocket unit;
    a slew bearing assembly that pivotally couples the chain housing to the axle housing, the slew bearing assembly including:
    a slew bearing housing that is fixedly disposed on the chain housing; and
    a slew bearing core that is fixedly disposed on the axle housing and is received between the chain housing and the slew bearing housing;
    a first thrust washer that is disposed between the chain housing and the slew bearing core; and
    a first seal that is disposed proximate an end of the first thrust washer and that extends from the chain housing to the slew bearing core, and a second seal that extends from the slew bearing housing to the slew bearing core.

15. The bogie axle system of claim 14 wherein the slew bearing assembly further comprises a radial sleeve that extends around the slew bearing core and is disposed between the slew bearing core and the slew bearing housing.

16. The bogie axle system of claim 14 wherein the slew bearing assembly further comprises a second thrust washer that is disposed opposite the first thrust washer and is disposed between the slew bearing housing and the slew bearing core.

17. The bogie axle system of claim 14 wherein the slew bearing housing extends continuously around the axle housing.

18. The bogie axle system of claim 14 wherein the slew bearing core has a ring portion that extends continuously around the axle housing.

19. The bogie axle system of claim 18 wherein the ring portion is disposed between the axle housing and the slew bearing housing and separates the axle housing from the slew bearing housing.

* * * * *